US009785020B2

(12) United States Patent
Ochiai et al.

(10) Patent No.: US 9,785,020 B2
(45) Date of Patent: Oct. 10, 2017

(54) LIQUID CRYSTAL DISPLAY DEVICE HAVING RECTANGULAR-SHAPED PIXEL ELECTRODES OVERLAPPING WITH COMB-SHAPED COUNTER ELECTRODES IN PLAN VIEW

(71) Applicants: Japan Display Inc., Tokyo (JP); Panasonic Liquid Crystal Display Co., Ltd., Himeji-shi, Hyogo-ken (JP)

(72) Inventors: Takahiro Ochiai, Chiba (JP); Tohru Sasaki, Mobara (JP); Hirotaka Imayama, Mobara (JP); Masateru Morimoto, Mobara (JP)

(73) Assignees: Japan Display Inc., Tokyo (JP); Panasonic Liquid Crystal Display Co., Ltd., Himej-shi (JP)

( * ) Notice: Subject to any disclaimer, the term of this patent is extended or adjusted under 35 U.S.C. 154(b) by 0 days.

(21) Appl. No.: 14/676,938

(22) Filed: Apr. 2, 2015

(65) Prior Publication Data
US 2015/0205175 A1 Jul. 23, 2015

Related U.S. Application Data

(63) Continuation of application No. 13/677,989, filed on Nov. 15, 2012, now abandoned, which is a (Continued)

(30) Foreign Application Priority Data

Sep. 26, 2005 (JP) .................................. 2005-278161

(51) Int. Cl.
*G02F 1/1343* (2006.01)
*G02F 1/1333* (2006.01)
(Continued)

(52) U.S. Cl.
CPC ........ *G02F 1/134363* (2013.01); *G02F 1/136* (2013.01); *G02F 1/1368* (2013.01);
(Continued)

(58) Field of Classification Search
CPC ......... G02F 1/133305; G02F 1/133345; G02F 1/136; G02F 1/136227; G02F 1/136277; G02F 1/1368
(Continued)

(56) References Cited

U.S. PATENT DOCUMENTS 6,816,222 B2   11/2004   Ono et al.
7,072,012 B2   7/2006    Jeong et al.
(Continued)

FOREIGN PATENT DOCUMENTS

WO    WO 01/18597    3/2001

*Primary Examiner* — Nathanael R Briggs
(74) *Attorney, Agent, or Firm* — Juan Carlos A. Marquez; Marquez IP Law Office, PLLC

(57) ABSTRACT

The present invention realizes a bright image display by enhancing a numerical aperture of pixels. At least a portion of a pixel electrode is overlapped to a thin film transistor by way of a first insulation film, the pixel electrode is connected to an output electrode of the thin film transistor via a contact hole which is formed in the first insulation film, the counter electrode is arranged above the pixel electrode by way of a second insulation film in a state that the counter electrode is overlapped to the pixel electrode, the counter electrode is formed at a position avoiding the contact hole formed in the first insulation film as viewed in a plan view, and at least a portion of the counter electrode is overlapped to the thin film transistor.

9 Claims, 5 Drawing Sheets

Related U.S. Application Data continuation of application No. 13/366,132, filed on Feb. 3, 2012, now Pat. No. 8,334,957, which is a continuation of application No. 13/067,501, filed on Jun. 6, 2011, now Pat. No. 8,134,673, which is a continuation of application No. 12/585,172, filed on Sep. 8, 2009, now Pat. No. 7,961,286, which is a continuation of application No. 11/498,158, filed on Aug. 3, 2006, now Pat. No. 7,605,898.

(51) Int. Cl.
    *G02F 1/1362*     (2006.01)
    *G02F 1/136*     (2006.01)
    *G02F 1/1368*     (2006.01)

(52) U.S. Cl.
    CPC .. *G02F 1/133305* (2013.01); *G02F 1/133345* (2013.01); *G02F 1/136227* (2013.01); *G02F 1/136277* (2013.01); *G02F 2201/40* (2013.01)

(58) Field of Classification Search
    USPC .................................................. 349/43, 141
    See application file for complete search history.

(56) References Cited

U.S. PATENT DOCUMENTS

| | | |
|---|---|---|
| 7,456,924 B2 | 11/2008 | Ono et al. |
| 2002/0047970 A1 | 4/2002 | Ono et al. |
| 2003/0179335 A1 | 9/2003 | Sato et al. |
| 2004/0027524 A1 | 2/2004 | Shiota et al. |
| 2004/0027525 A1* | 2/2004 | Itakura ............. G02F 1/134363 349/141 |
| 2005/0030450 A1 | 2/2005 | Okamoto et al. |
| 2005/0030461 A1* | 2/2005 | Ono .................. G02F 1/133345 349/141 |
| 2005/0174521 A1 | 8/2005 | Nishida et al. |
| 2006/0007380 A1 | 1/2006 | Yamazaki et al. |

* cited by examiner

LIQUID CRYSTAL DISPLAY DEVICE HAVING RECTANGULAR-SHAPED PIXEL ELECTRODES OVERLAPPING WITH COMB-SHAPED COUNTER ELECTRODES IN PLAN VIEW

CROSS REFERENCE TO RELATED APPLICATIONS

This application is a Continuation Application of U.S. application Ser. No. 13/677,989 filed Nov. 15, 2012, which is a Continuation Application of U.S. application Ser. No. 13/366,132 filed Feb. 3, 2012, which is a Continuation Application of U.S. application Ser. No. 13/067,501 filed Jun. 6, 2011, which is a Continuation Application of U.S. application Ser. No. 12/585,172 filed on Sep. 8, 2009, which is a continuation of U.S. application Ser. No. 11/498,158 filed on Aug. 3, 2006. The present application claims priority from U.S. application Ser. No. 13/677,989 filed Nov. 15, 2012, which claims priority from U.S. application Ser. No. 13/366,132 filed Feb. 3, 2012, which claims priority from U.S. application Ser. No. 13/067,501 filed Jun. 6, 2011, which claims priority from U.S. application Ser. No. 12/585,172 filed on Sep. 8, 2009, which claims priority from U.S. application Ser. No. 11/498,158 filed on Aug. 3, 2006, which claims priority from Japanese Patent Application No. 2005-278161 filed on Sep. 26, 2005, the content of which is hereby incorporated by reference into this application.

BACKGROUND OF THE INVENTION

The present invention relates to a liquid crystal display device, and more particularly to a lateral-electric-field-type liquid crystal display device which can enhance a display numerical aperture.

As a display device for various kinds of personal digital assistants and television receiver sets, a display device which uses a so-called flat-type display panel as represented by a liquid crystal display device has been a mainstream. Further, as the liquid crystal display device, an active-method-type liquid crystal display device has been popularly used. The active-method-type liquid crystal display device generally uses a thin film transistor as a drive element of a pixel and hence, hereinafter, the display device which adopts the thin film transistor as the drive element is explained as an example. As one type of such a liquid crystal display device, there has been known a lateral-electric-field-type liquid crystal display device which is referred to IPS (in-plane-switching) type display device.

FIG. 9 is a plan view for explaining an example of the base pixel structure of the thin film transistor of the IPS type liquid crystal display device. Further, FIG. 10 is a cross-sectional view of the display device which also includes a color filter substrate taken along a line D-D' in FIG. 9. The planer constitution of the pixel of the IPS type liquid crystal display device is, as shown in FIG. 9, formed in the inside of a region which is surrounded by two gate lines GL and two data lines DL. A thin film transistor TFT is formed on a portion of the region, (pixel region). The thin film transistor TFT has a drain (or a source) electrode SD2 thereof connected to the data line DL, has a gate electrode GT thereof connected to the gate line GL, and has a source (drain) electrode SD1 connected to a pixel electrode PX through a contact hole CH. Here, although the drain electrode and the source electrode are exchanged from each other during an operation, the explanation is made hereinafter with respect to a case in which the thin film transistor TFT includes the source electrode SD1 and the drain electrode SD2.

As shown in FIG. 10, the cross-sectional structure of the pixel forms the thin film transistor TFT which is constituted of a semiconductor layer (silicon semiconductor) SI, a second insulation film INS2, the gate electrode GT, a third insulation film INS3, the source electrode SD1 and the drain electrode SD2 on a first insulation film INS1 which is formed on a main surface of one substrate (a thin film transistor substrate, hereinafter, a TFT substrate) SUB1 which is preferably made of glass. Here, the scanning lines GL shown in FIG. 9 are formed on the same layer as the gate electrodes GT, the data lines DL are formed on the third insulation film INS3, and the source electrodes SD1 and the drain electrodes SD2 are formed on the same layer as the data lines DL. The source electrodes SD1 and the drain electrodes SD2 are connected to the semiconductor layers SI via the contact holes which are formed in the second insulation film INS2 at the time of forming the source electrodes SD1, drain electrodes SD2 as films.

A fourth insulation film INS4 which constitutes a protective film (passivation film) is formed in a state that the fourth insulation film INS4 covers the source electrode SD1, the drain electrode SD2 and the data lines DL. Here, a counter electrode CT is formed in a spreading manner on the fourth insulation film INS4 in a state that a contact electrode CT covers a most portion of the pixel region, and a contact hole CH which reaches the source electrode SD1 is formed in the fourth insulation film INS4. Further, a fifth insulation film INS5 is formed in a state that the fifth insulation film INS5 covers the counter electrode CT.

The pixel electrode PX is formed on the fifth insulation film INS5 in a comb-teeth shape, and one end of the pixel electrode PX is connected to the source electrode SD1 via the contact hole CH. Then, an orientation film ORI1 is formed in a state that the orientation film covers a topmost surface of the pixel electrode PX.

On a main surface of another substrate (color filter substrate, hereinafter, referred to as a CF substrate) SUB2 which is preferably made of glass, color filters CF which are defined from each other by a black matrix BM are formed, and an orientation film ORI2 is formed on a topmost surface of the substrate SUB2. The current display devices mostly adopt a full color display. In this full color display, basically, unit pixels (sub pixels) of three colors consisting of red (R), green (G), and blue (B) constitute one color pixel.

In the IPS type liquid crystal display device, a liquid crystal LC is sealed in the inside of a space between the orientation film ORI1 of the TFT substrate SUB1 and the orientation film ORI2 of the CF substrate SUB2. The liquid crystal LC which is driven by the thin film transistor TFT is rotated by a component of an electrical field E parallel to a surface of the substrate which is generated between the pixel electrode PX and the counter electrode CT in the inside of the surface in which the orientation direction of the liquid crystal LC is parallel to the surface of the substrate and hence, the lighting and non-lighting of the pixel can be controlled. As a document which discloses such an IPS-type liquid crystal display device, International Publication WO 01/018597 can be named.

SUMMARY OF THE INVENTION

In an IPS-type liquid crystal display device, as shown in FIG. 10, a portion of a contact hole CH which connects a pixel electrode to a source electrode constituting an output electrode of the thin film transistor is not used as a display region together with a portion on which the thin film transistor is arranged. Also a black matrix which is mounted on a CF substrate is formed in a state that the black matrix covers the thin film transistor and the contact hole portion. Accordingly, the increase of an effective area of the pixel, that is, the enhancement of a numerical aperture is limited.

It is an object of the present invention to provide a lateral-electric-field-type liquid crystal display device which can enhance a numerical aperture of pixels thus realizing a bright image display.

Typical constitutions of the present invention are described hereinafter.

(1) A liquid crystal display device which includes a first substrate having pixel electrodes, counter electrodes and thin film transistors, a second substrate which faces the first substrate in an opposed manner, and a liquid crystal layer between the first substrate and the second substrate, wherein at least a portion of the pixel electrode is overlapped to the thin film transistor via a first insulation film, the pixel electrode is connected to an output electrode of the thin film transistor via a contact hole which is formed in the first insulation film, and the counter electrode is arranged above the pixel electrode by way of a second insulation film in a state that the counter electrode is overlapped to the pixel electrode, the counter electrode is formed at a position avoiding the contact hole formed in the first insulation film as viewed in a plan view, and at least a portion of the counter electrode is overlapped to the thin film transistor.

(2) In the constitution (1), a region where the contact hole is formed is a reflective display region.

(3) In the constitution (1) or (2), at least a portion of the region of the thin film transistor constitutes a reflective display region.

(4) In the constitution (1), the liquid crystal display device includes a reflective display region.

(5) In any one of the constitutions (1) to (4), the liquid crystal display device includes a reflective display region and a transmissive display region.

(6) In any one of the constitutions (1) to (5), an input electrode and the output electrode of the thin film transistor are formed of a reflective conductive film.

(7) In any one of the constitutions (1) to (6), the pixel electrode is formed of a transparent conductive film.

(8) In any one of the constitutions (1) to (6), at least a portion of the pixel electrode is formed of a reflective conductive film.

(9) In any one of the constitutions (1) to (4), the pixel electrode, the input electrode and the output electrode of the thin film transistor are formed of a reflective conductive film.

(10) In any one of the constitutions (1) to (9), a portion of the second insulation film is filled in the contact hole, and the second insulation film in the region overlapped to the contact hole has a liquid-crystal-layer-side surface thereof leveled.

(11) In any one of the constitutions (1) to (9), an insulation member which is made of a material different from a material of the second insulation film is filled in the contact hole, and the second insulation film in the region overlapped to the contact hole has a liquid-crystal-layer-side surface thereof leveled.

It is needless to say that the present invention is not limited to the constitutions which are described above and the constitutions which will be explained in conjunction with embodiments described later and various modifications are conceivable without departing from the technical concept of the present invention.

According to the constitution of the present invention, the thin film transistor and the contact hole portion which connects an output electrode of the TFT to the pixel electrode which have been considered as portions which do not contribute to a display in the pixel region can be used as the reflective display region and hence, it is possible to enhance a numerical aperture and to increase a display brightness. Further, conventionally, thicknesses of the electrode and the insulation film which have been formed on the contact hole portion are reduced compared to thicknesses of the electrode and the insulation film which have been formed on a leveled surface portion and hence, there exists a possibility that short-circuiting occurs between the counter electrode and the pixel electrode which are formed on the contact hole portion. According to the present invention which eliminates the mounting of the counter electrode on the contact hole portion, it is possible to avoid the occurrence of the above-mentioned short-circuiting.

Further, according to the present invention, since the surface of the insulation film can be leveled by embedding the insulation member in the opening formed in the insulation film which is formed on the contact hole portion, the orientation film which is formed over the insulation film can be leveled. Accordingly, it is also possible to impart the accurate orientation to the liquid crystal on the contact hole portion in the same manner as other portions thus eliminating a display defect such as a light leakage or the like attributed to the defective orientation.

DESCRIPTION OF THE PREFERRED EMBODIMENTS

Hereinafter, embodiments of the present invention are explained in detail in conjunction with drawings of embodiments.

Embodiment 1

Figure 1:
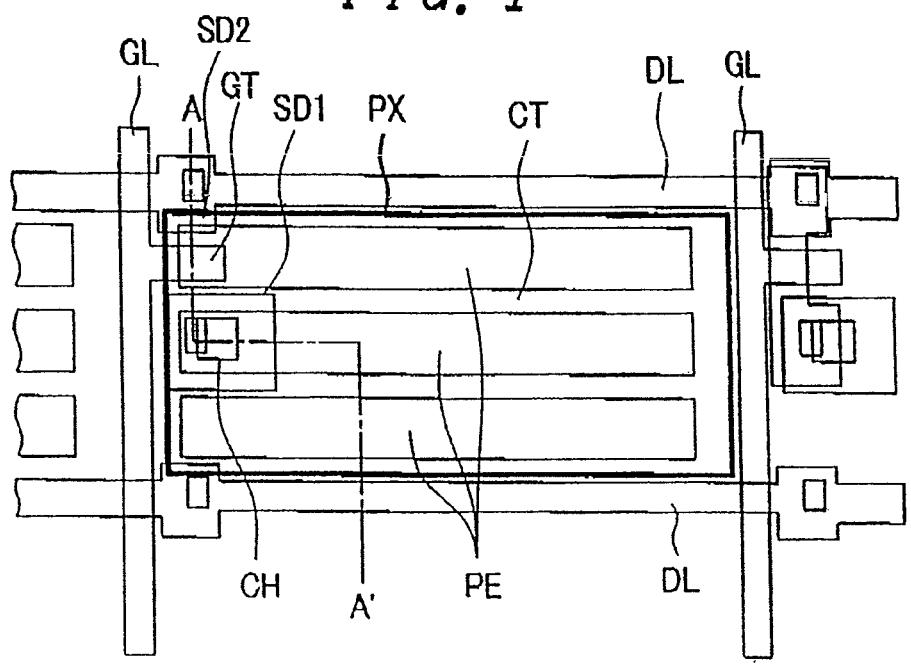
FIG. 1 is a plan view which shows an example of the constitution of one pixel for explaining an embodiment 1 of a liquid crystal display device according to the present invention.
Figure 2:
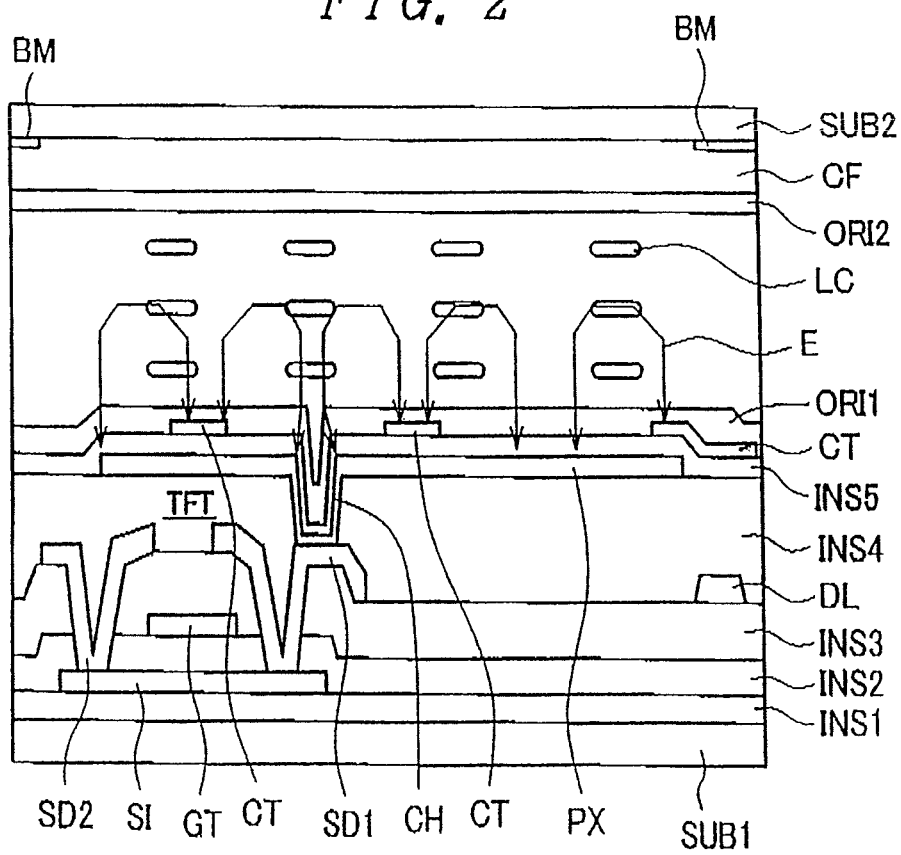
FIG. 2 is a cross-sectional view taken along a line A-A' in FIG. 1.
Figure 10:
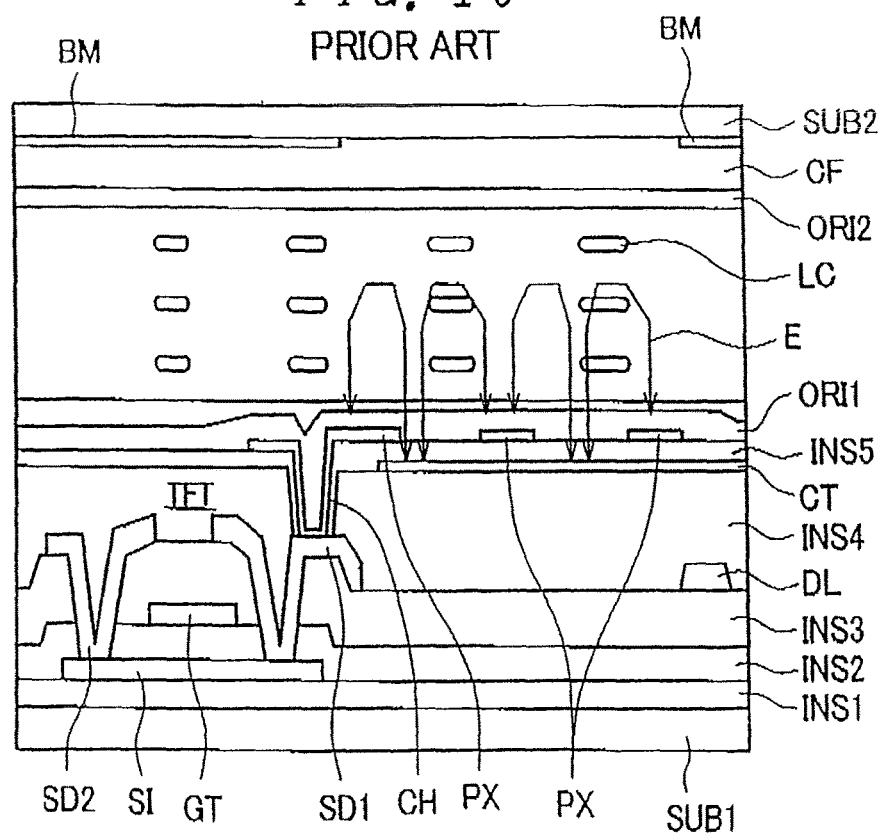
FIG. 10 is a cross-sectional view of the liquid crystal display device which also includes a color filter substrate taken along a line D-D' in FIG. 9.

FIG. 1 is a plan view which shows an example of the constitution of one pixel for explaining an embodiment 1 of a liquid crystal display device according to the present invention. Further, FIG. 2 is a cross-sectional view taken along a line A-A' in FIG. 1. This liquid crystal display device is of an IPS type. In the same manner as the display device shown in FIG. 10, a pixel region is formed in a region which is surrounded by two scanning lines (hereinafter, also referred to as gate lines) GL and two image signal lines (hereinafter, also referred to as data lines) DL. A thin film transistor TFT which constitutes an active element is formed in a portion of the pixel region. The thin film transistor TFT has a drain (or a source) electrode SD2 thereof connected to the data line DL, has a gate electrode GT thereof connected to the gate line GL and has a source (a drain) electrode SD1 thereof connected to a pixel electrode PX via a contact hole CH.

As shown in FIG. 2 which is a cross-sectional view taken along a line A-A' in FIG. 1, the cross-sectional structure of the pixel includes the thin film transistor TFT which is constituted of a semiconductor layer (silicon semiconductor) SI, a second insulation film INS2, the gate electrode GT, a third insulation film INS3, the source electrode SD1 and the drain electrode SD2 on a first insulation film INS1 which is formed on a main surface of one substrate (thin film transistor substrate, hereinafter, also referred to as a TFT substrate) SUB1 which is preferably made of glass. Here, the gate lines GL shown in FIG. 1 are formed on the same layer as the gate electrodes GT, the data lines DL are formed on the third insulation film INS3, and the source electrodes SD1 and the drain electrodes SD2 are formed on the same layer as the data lines DL. The source electrode SD1 and the drain electrode SD2 are connected to the semiconductor layer SI via contact holes which are formed in the second insulation film INS2 at the time of forming these electrodes.

A fourth insulation film INS4 which constitutes a protective film (passivation film) is formed in a state that the fourth insulation film INS4 covers the source electrode SD1, the drain electrode SD2 and the data lines DL. Here, a pixel electrode PX is formed in a spreading manner on the fourth insulation film INS4 in a state that the pixel electrode PX covers a most portion of the pixel region including a portion above the thin film transistor TFT. A contact hole CH which reaches the source electrode SD1 is formed in the fourth insulation film INS4. Further, a fifth insulation film INS5 is formed on the fourth insulation film INS4 in a state that the fifth insulation film INS5 covers the pixel electrode PX. A counter electrode CT is formed on the fifth insulation film INS5 in a comb-teeth shape. Here, symbol PE indicates cutout portions of the counter electrode CT and the pixel electrode which is exposed from the cutout portions are viewed. Further, an orientation film ORI1 is formed to cover a topmost surface of the counter electrode CT.

On the main surface of another substrate (color filter substrate, hereinafter, referred to as a CF substrate) SUB2 which is preferably made of glass, the color filters CF which are defined from each other by a black matrix BM are formed, and an orientation film ORI2 is formed on a topmost surface of the substrate SUB2. The currently available display devices mostly adopt a full color display. In the full color display (hereinafter, also simply referred to as a color display), basically, unit pixels (sub pixels) of three colors consisting of red (R), green (G), and blue (B) constitute one color pixel.

In the IPS-type liquid crystal display device, liquid crystal LC is sealed in the inside of a space between the orientation film ORI1 of the TFT substrate SUB1 and the orientation film ORI2 of the CF substrate SUB2. With respect to the liquid crystal LC which is driven by the thin film transistor TFT, the orientation direction of the liquid crystal LC is rotated by a component parallel to a surface of the substrate of an electrical field E which is generated between the pixel electrode PX and the counter electrode CT in a plane parallel to the substrate surface thus controlling the lighting and non-lighting of the pixel.

Here, the manufacturing process of the liquid crystal display device of the embodiment 1 is explained. On an insulation substrate which is preferably made of glass, a semiconductor island is formed by forming an a-Si or p-Si semiconductor film by patterning. Since a process for forming the insulation films and the gate electrodes and a process for forming the source electrodes SD1 and the drain electrodes SD2 on the semiconductor island are already known, the explanation of these processes is omitted. In the embodiment 1, the source electrode SD1 and the drain electrode SD2 of the thin film transistor TFT are formed of a stacked film of MoW/AlSi/MoW.

After forming the source electrode SD1 and the drain electrode SD2, a fourth insulation film is formed over the source electrode SD1 and the drain electrode SD2. A forming method of the fourth insulation film is explained hereinafter. First of all, an organic resin which is formed of polymethyl silazane is applied to the substrate using a spin coating method. Using a photo mask which has a desired pattern, the exposure is performed by radiating i rays to the organic resin and, thereafter, the organic resin is humidified thus forming silanol. The silanol is developed by an alkali developer and is removed. Next, the full surface exposure is performed by radiating ghi rays to the substrate and, thereafter, the substrate is humidified again. Accordingly, the silanol is formed on a portion where the silanol is not removed by the above-mentioned developing. Polymethyl siloxane is formed on the desired portion by baking the silanol thus forming the fourth insulation film.

A contact hole which connects the source electrode of the thin film transistor TFT and the pixel electrode described later to each other is formed by removing the insulation film 4 by patterning. A thickness of the insulation film 4 is set to 1 μm.

With respect to the pixel electrode PX, an ITO film which is a transparent conductor film is formed with a thickness of 77 nm by sputtering, and a photosensitive resist is applied to the ITO film. The exposure is performed using a photo mask which has a desired pattern, and the photosensitive resist is partially removed using an alkali developer (the exposed portion being removed when a positive-type photosensitive resist is used). Using the pattern of the photosensitive resist as a mask, the transparent conductor film is removed by an ITO etchant (for example, oxalic acid).

Then, the photosensitive resist is removed using a resist peeling liquid (for example, monoethanolamine: MEA). The pattern of the formed pixel electrode PX has a rectangular shape, and is formed on the substantially whole surface of the region which is surrounded by the image signal lines and the scanning signal lines.

On the ITO film which constitutes the pixel electrode PX, a fifth insulation film INS5 which is made of SiN (dielectric constant: 6.7) is formed using a CVD method. In this embodiment, a thickness of the fifth insulation film is set to 300 nm. Here, although the patterning of the fifth insulation film is substantially equal to the patterning adopted by a method for forming the pixel electrode, the SiN film is etched by dry etching using a $SF_6+O_2$ gas or a $CF_4$ gas.

The comb-teeth-shaped counter electrode CT is formed in the same process as the pixel electrode PX. The counter electrode CT is formed by avoiding a portion above the contact hole which connects the pixel electrode PX and the source electrode of the thin film transistor TFT to each other.

Next, a driving method of the liquid crystal display device of the embodiment 1 is explained. An image signal is supplied to the pixel electrode PX via the thin film transistor TFT. A constant voltage is applied to the counter electrode CT or an AC voltage (AC driving) is applied to the counter electrode at the timing of supplying scanning signals. When such a voltage is applied, between the pixel electrode PX and the edge of the comb-teeth shaped counter electrode CT, a so-called fringe electric field E is generated (see, FIG. 1). Further, the molecular orientation of the liquid crystal LC is controlled by the fringe electric field E.

In the embodiment 1, since the counter electrode CT is not arranged above the contact hole for connecting the pixel electrode PX to the source electrode of the thin film transistor TFT, the liquid crystal molecules which exist above the contact hole have the orientation thereof also controlled by the fringe electric field E and contribute to a display. That is, by forming the source electrode SD1 and the drain electrode SD2 using a reflective conductive film, an upper region of the thin film transistor TFT which includes the contact hole CH portion also forms a reflective display region, while forming the pixel electrode PX in the pixel region other than the thin film transistor TFT as the transparent conductive film such as the ITO film, it is possible to constitute a reflective/transmissive liquid crystal display device which can enhance an numerical aperture thereof. Further, even when a portion of the pixel electrode PX is formed of the reflective conductive film, it is possible to constitute the reflective/transmissive liquid crystal display device.

Further, by forming a reflective metal film on the ITO film which constitutes the pixel electrode PX or by forming the whole pixel electrode PX per se using a reflective conductive film in the same manner as the source electrode SD1 and the drain electrode SD2, it is possible to constitute a reflective liquid crystal display device.

Still further, by adopting the constitution described in the embodiment 1, even when the insulation film at the contact hole CH portion has a small thickness, the counter electrode CT is not arranged on the portion and hence, the occurrence of the short-circuiting of the pixel electrode PX and the counter electrode CT is prevented whereby a yield rate is enhanced thus enabling the acquisition of a highly reliable liquid crystal display device.

Embodiment 2

Figure 3:
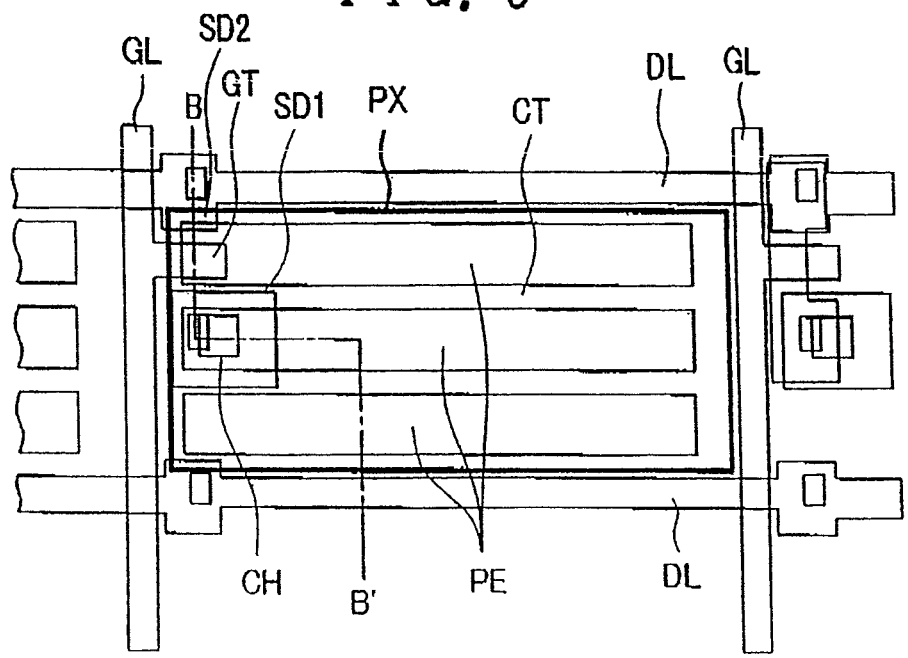
FIG. 3 is a plan view which shows an example of the constitution of one pixel for explaining an embodiment 2 of a liquid crystal display device according to the present invention.
Figure 4:
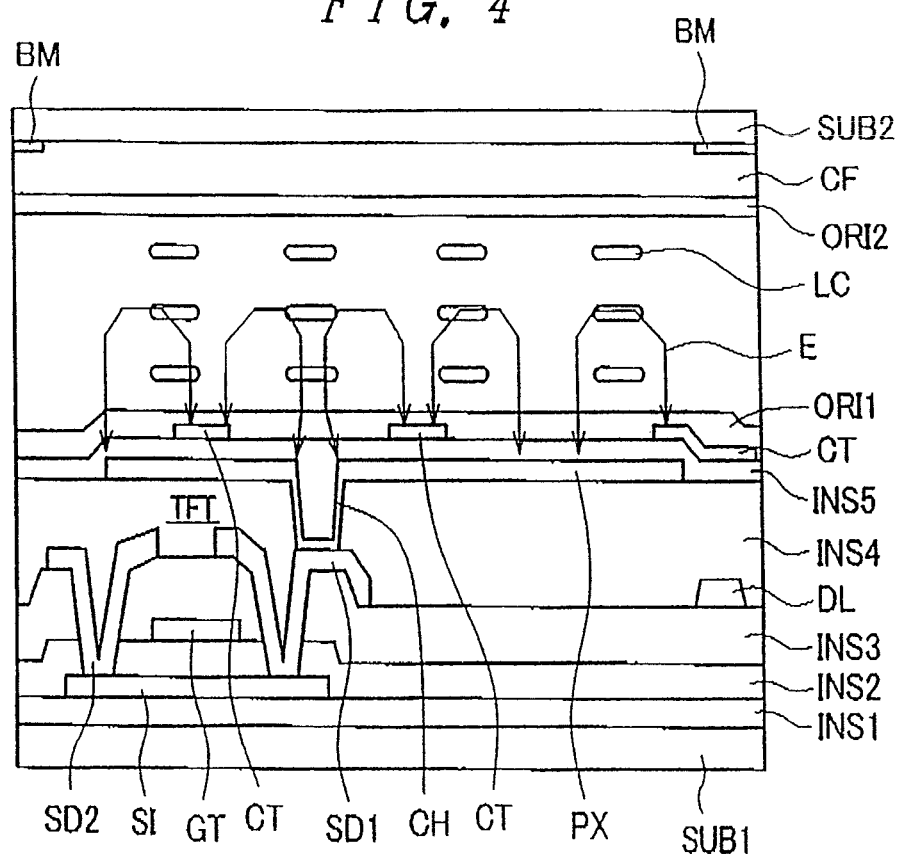
FIG. 4 is a cross-sectional view taken along a line B-B' in FIG. 3.

FIG. 3 is a plan view which shows an example of the constitution of one pixel for explaining an embodiment 2 of a liquid crystal display device according to the present invention, while FIG. 4 is a cross-sectional view taken along a line B-B' in FIG. 3. The liquid crystal display device of the embodiment 2 is also of an IPS type. In the same manner as the embodiment 1, a pixel region is formed in the inside of a region which is surrounded by two gate lines GL and two data lines DL. A thin film transistor TFT is formed at a portion of the pixel region. The thin film transistor TFT has a drain (or a source) electrode SD2 thereof connected to the data line DL, has a gate electrode GT thereof connected to the gate line GL, and has a source (a drain) electrode SD1 thereof connected to a pixel electrode PX via a contact hole CH.

As shown in FIG. 4 which is a cross-sectional view taken along a line B-B' in FIG. 3, the cross-sectional structure of the pixel includes the thin film transistor TFT which is constituted of a semiconductor layer SI, a second insulation film INS2, the gate electrode GT, a third insulation film INS3, the source electrode SD1 and the drain electrode SD2 on a first insulation film INS1 which is formed on a main surface of a TFT substrate SUB1. Here, the gate lines GL shown in FIG. 3 are formed on the same layer as the gate electrodes GT, the data lines DL are formed on the third insulation film INS3, and the source electrodes SD1 and the drain electrodes SD2 are formed on the same layer as the data lines DL. The source electrode SD1 and the drain electrode SD2 are connected to the semiconductor layer SI via contact holes which are formed in the second insulation film INS2 at the time of forming these electrodes.

A fourth insulation film INS4 is formed in a state that the fourth insulation film INS4 covers the source electrode SD1, the drain electrode SD2 and the data lines DL. Here, a pixel electrode PX is formed in a spreading manner on the fourth insulation film INS4 in a state that the pixel electrode PX covers a most portion of the pixel region including a portion above the thin film transistor TFT. A contact hole CH which reaches the source electrode SD1 is formed in the fourth insulation film INS4. Further, a fifth insulation film INS5 is formed in a state that the fifth insulation film INS5 covers the pixel electrode PX. The fifth insulation film INS5 is filled in the inside of the contact hole CH, and a surface of the fifth insulation film INS5 including an upper portion of the contact hole CH is leveled. On the leveled fifth insulation film INS5, a counter electrode CT is formed in a comb-teeth shape. Here, symbol PE indicates cutout portions of the counter electrode CT, and the pixel electrode which is exposed from the cutout portions are viewed. Further, an orientation film ORI1 is formed to cover a topmost surface of the counter electrode CT.

On a main surface of a CF substrate SUB2, color filters CF which are defined from each other by a black matrix BM are formed in the same manner as the embodiment 1, and an orientation film ORI2 is formed on a topmost surface of the CF substrate SUB2. Each color filter CF is basically constituted of unit pixels (sub pixels) of three colors consisting of red (R), green (G), and blue (B), and a color one pixel (pixel) is constituted of the three colors of the unit pixels.

Liquid crystal LC is sealed in the inside of a space between the orientation film ORI1 of the TFT substrate SUB1 and the orientation film ORI2 of the CF substrate SUB2. With respect to the liquid crystal LC which is driven by the thin film transistor TFT, the orientation direction of the liquid crystal is rotated by a component parallel to a surface of the substrate of an electrical field E which is generated between the pixel electrode PX and the counter electrode CT in a plane parallel to the substrate surface thus controlling the lighting and non-lighting of the pixel.

The manufacturing process of the liquid crystal display device of the embodiment 2 is explained hereinafter by focusing on points which make this embodiment 2 different from the embodiment 1. With respect to the process up to the formation of the pixel electrode PX in which the source electrode SD1 and the drain electrode SD2 are formed, the fourth insulation film is formed over the source electrode SD1 and the drain electrode SD2 and, thereafter, the pixel electrodes PX are formed, such a process is substantially equal to the process of the embodiment 1. Thereafter, a photosensitive resist (for example, JSR-made PC-452) is applied to an ITO film which forms the pixel electrodes PX. The photosensitive resist is exposed using a photo mask which has a desired pattern, the photosensitive resist is partially removed using an alkali developer, and the stacked structure is baked. Although irregularities of a surface can be controlled based on baking conditions of this baking, in this embodiment, a baking temperature is set to 230° C. and a baking period is set to 60 minutes so as to substantially level a surface of the fifth insulation film INS5. Further, the fifth insulation film INS5 assumes a film thickness of 300 nm at a surface leveled portion (other than the contact hole portion) of the pixel electrodes after baking.

Although a forming process of the counter electrode CT of the embodiment 2 is equal to the forming process of the counter electrode CT of the embodiment 1, in the embodiment 2, the formation of the counter electrode CT above the contact hole CH is not excluded.

Next, a driving method of the liquid crystal display device of the embodiment 2 is explained hereinafter by focusing on points which make this embodiment 2 different from the embodiment 1. In the embodiment 1, rubbing treatment of the orientation film may not be sufficiently performed depending on the degree of irregularities of a portion on which the contact hole CH is formed and hence, a liquid crystal orientation regulating force (an anchoring strength) may become small thus easily generating an image retention. The image retention is a phenomenon in which liquid crystal which is driven by an electric field does not return to an initial state even after the electric field is eliminated. However, according to the constitution of the embodiment 2, the surface of the fifth insulation film INS5 which is formed above a portion in which the contact hole CH is formed is leveled and hence, the rubbing treatment can be performed sufficiently whereby the generation of the image retention can be suppressed.

Embodiment 3

Figure 5:
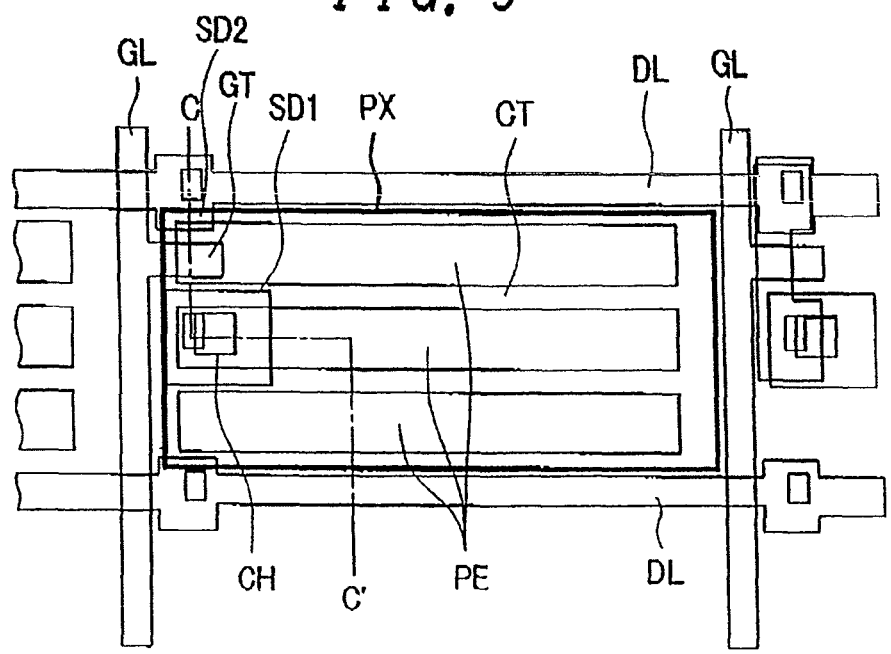
FIG. 5 is a plan view which shows an example of the constitution of one pixel for explaining an embodiment 3 of a liquid crystal display device according to the present invention.
Figure 6:
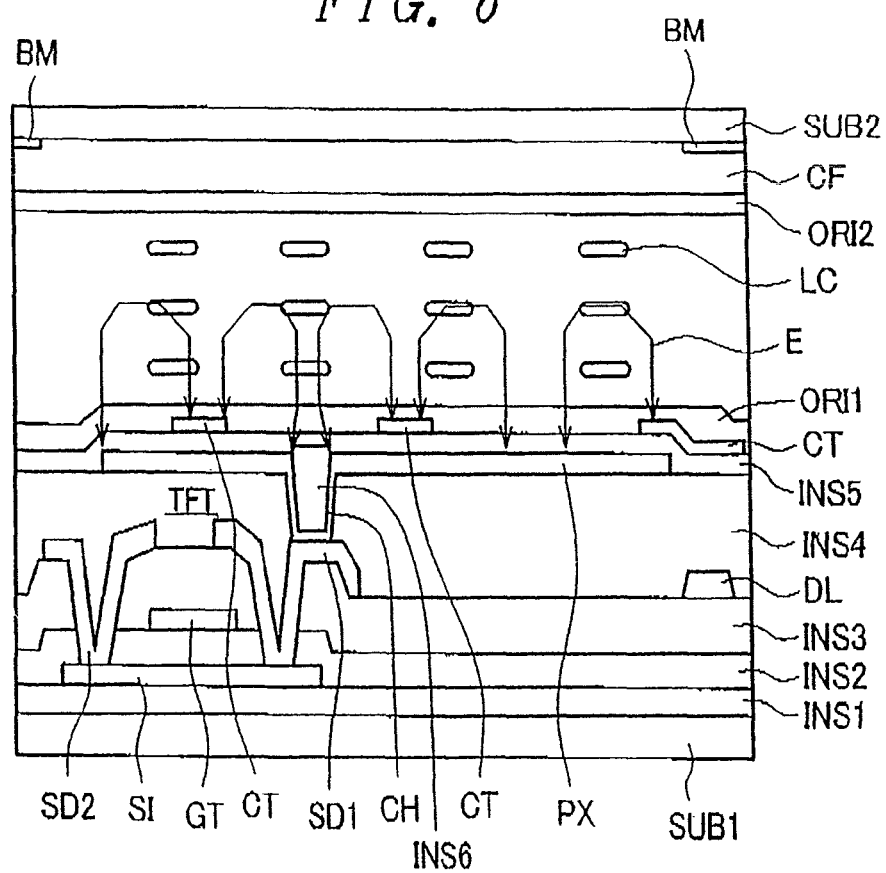
FIG. 6 is a cross-sectional view taken along a line C-C' in FIG. 5.

FIG. 5 is a plan view which shows an example of the structure of one pixel for explaining an embodiment 3 of the liquid crystal display device according to the present invention, while FIG. 6 is a cross-sectional view taken along a line C-C' in FIG. 5. The liquid crystal display device of the embodiment 3 is also of an IPS type. In the same manner as the embodiment 1 and the embodiment 2, a pixel region is formed in the inside of a region which is surrounded by two gate lines GL and two data lines DL. A thin film transistor TFT is formed at a portion of the pixel region. The thin film transistor TFT has a drain (or a source) electrode SD2 thereof connected to the data lines DL, has a gate electrode GT thereof connected to the gate lines GL and has a source (a drain) electrode SD1 there of connected to a pixel electrode PX via a contact hole CH.

As shown in FIG. 6 which is a cross-sectional view taken along a line C-C' in FIG. 5, the cross-sectional structure of the pixel includes the thin film transistor TFT which is constituted of a semiconductor layer SI, a second insulation film INS2, the gate electrode GT, a third insulation film INS3, the source electrode SD1 and the drain electrode SD2 on a first insulation film INS1 which is formed on a main surface of a TFT substrate SUB1. Here, the gate lines GL shown in FIG. 5 are formed on the same layer as the gate electrodes GT, the data lines DL are formed on the third insulation film INS3, and the source electrodes SD1 and the drain electrodes SD2 are formed on the same layer as the data lines DL. The source electrode SD1 and the drain electrode SD2 are connected to the semiconductor layer SI via contact holes which are formed in the second insulation film INS2 at the time of forming these electrodes.

A fourth insulation film INS4 is formed in a state that the fourth insulation film INS4 covers the source electrode SD1, the drain electrode SD2 and the data lines DL. Here, a pixel electrode PX is formed in a spreading manner on the fourth insulation film INS4 in a state that the pixel electrode PX covers a most portion of the pixel region including a portion above the thin film transistor TFT. A contact hole CH which reaches the source electrode SD1 is formed in the fourth insulation film INS4. A sixth insulation film INS6 is filled in the inside of the contact hole CH, a fifth insulation film INS5 is formed on the sixth insulation film INS6 in a state that the fifth insulation film INS5 covers the pixel electrode PX. A surface of the fifth insulation film INS5 including an upper portion of the contact hole CH is leveled. On the leveled fifth insulation film INS5, a counter electrode CT is formed in a comb-teeth shape. Here, symbol PE indicates cutout portions of the counter electrode CT, and the pixel electrode which is exposed from the cutout portions are viewed. Further, an orientation film ORI1 is formed to cover a topmost surface of the counter electrode CT.

On a main surface of a CF substrate SUB2, color filters CF which are defined from each other by a black matrix BM are formed in the same manner as the embodiment 1 and the embodiment 2, and an orientation film ORI2 is formed on a topmost surface of the CF substrate SUB2. Each color filter CF is basically constituted of unit pixels (sub pixels) of three colors consisting of red (R), green (G), and blue (B), and a color pixel (pixel) is constituted of the unit pixels of the three colors.

A liquid crystal LC is sealed in the inside of a space between the orientation film ORI1 of the TFT substrate SUB1 and the orientation film ORI2 of the CF substrate SUB2. With respect to the liquid crystal LC which is driven by the thin film transistor TFT, the orientation direction of the liquid crystal is rotated by a component parallel to a surface of the substrate of an electrical field E which is generated between the pixel electrode PX and the counter electrode CT in a plane parallel to the substrate surface thus controlling the lighting and non-lighting of the pixel.

In the embodiment 3, A SiN film having a film thickness of 300 nm is formed as the fifth insulation film INS5. The patterning of the fifth insulation film INS5 is substantially equal to the patterning of the fifth insulation film adopted in the embodiment 1. After the formation of the fifth insulation film INS5, the photosensitive resist (PC-452 made by JSR) is filled in the contact hole CH thus forming sixth insulation film INS6. The patterning of the photosensitive resist is substantially equal to the patterning of the photosensitive resist adopted in the embodiment 2. The forming process of the counter electrode CT in the embodiment 3 is substantially equal to the forming process of the counter electrode CT adopted in the embodiments 1, 2.

A driving method of the liquid crystal display device of the embodiment 3 is explained hereinafter by focusing on points which make this embodiment 3 different from the embodiment 2. In the embodiment 3, the insulation film which is arranged between the pixel electrode PX and the counter electrode CT exhibits a high dielectric constant, and the smaller the film thickness of the insulation film, an electric field applied to the liquid crystal is increased thus eventually lowering a liquid crystal drive voltage (see FIG. 7, FIG. 8).

Figure 7:
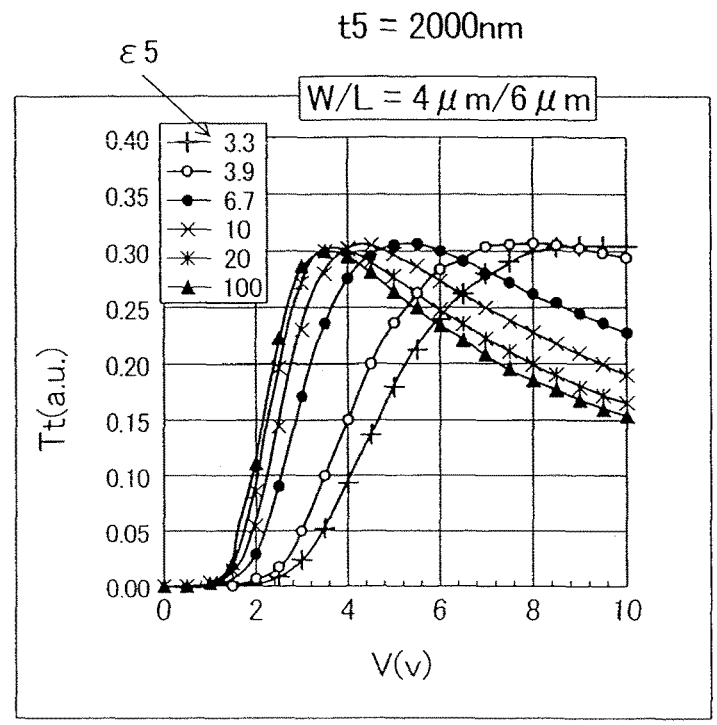
FIG. 7 is an explanatory view of a transmissive brightness-voltage characteristic due to a dielectric constant of a fifth insulation film for explaining an embodiment 3.
Figure 8:
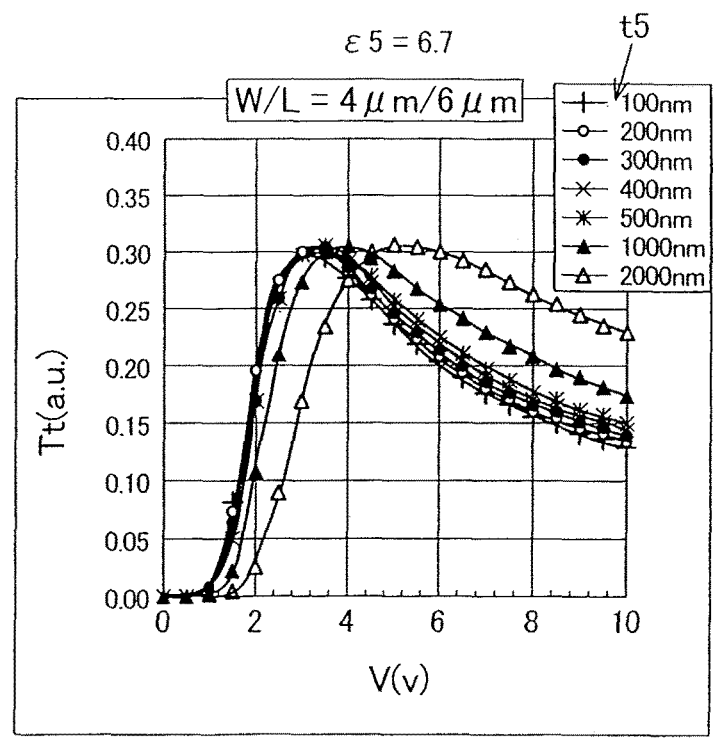
FIG. 8 is an explanatory view of a transmissive brightness-voltage characteristic due to a film thickness of the fifth insulation film for explaining the embodiment 3.
Figure 9:
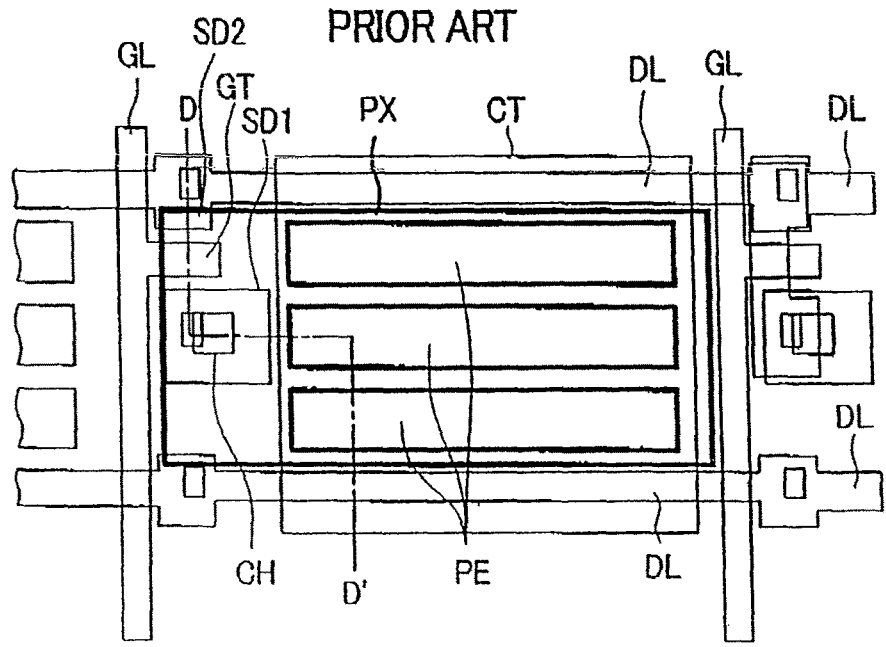
FIG. 9 is a plan view which explains one example of the basic pixel structure of a thin film transistor-substrate-side of an ISP-type liquid crystal display device.

FIG. 7 is an explanatory view of a transmissive brightness-voltage characteristic due to a dielectric constant of a fifth insulation film for explaining the embodiment 3, while FIG. 8 is an explanatory view of a transmissive brightness-voltage characteristic due to a film thickness of a fifth insulation film for explaining the embodiment 3. In FIG. 7 and FIG. 8, symbol V indicates a liquid crystal drive voltage, symbol Tt indicates transmissivity, $\in 5$ indicates the dielectric constant of the fifth insulation film INS5, and symbol t5 indicates a film thickness of the fifth insulation film INS5. Here, a width W of the teeth-like counter electrode CT and an electrode distance L of the counter electrodes CT is 4 µm and 6 µm respectively.

In the embodiment 2, a film thickness of the resin having a dielectric constant of 3.3 which constitutes the fifth insulation film INS5 may be set to a value less than 300 nm. However, this resin exhibits a poor insulation dielectric strength and hence, a leak current is generated between the pixel electrode and the counter electrode thus lowering a liquid holding voltage. To the contrary, in the embodiment 3, at a portion where the pixel electrode is leveled, by forming the fifth insulation film INS5 using SiN having a high dielectric constant and a high insulation dielectric strength (dielectric constant: 6.7), it is possible to realize the low drive voltage and the suppression of leak current. Further, at a portion which has the irregular surface such as the contact hole, by adopting the stacked structure consisting of the fifth insulation film INS5 and the sixth insulation film INS6, it is possible to prevent the short-circuiting between the pixel electrode and the counter electrode and hence, the surface of the fifth insulation film INS5 can be leveled whereby it is possible to realize the enhancement of the liquid crystal orientation restricting force.

What is claimed is:

1. A liquid crystal display device comprising:
   a first substrate and a second substrate;
   a liquid crystal layer disposed between the first substrate and the second substrate;
   a plurality of gate lines and a plurality of drain lines formed on the first substrate; and
   a plurality of pixel regions surrounded by the plurality of gate lines and the plurality of drain lines,
   wherein each of the plurality of pixel regions comprises a thin film transistor which is connected to one of the plurality of gate lines and one of the plurality of drain lines and comprises a semiconductor layer, a pixel electrode which is connected to the thin film transistor, a counter electrode having a plurality of cutout portions, and a first insulation layer which is disposed between the pixel electrode and the counter electrode,
   wherein a second insulation layer is formed between the pixel electrode and the drain lines,
   wherein the pixel electrode is formed with a planar shape in the pixel region,
   wherein the liquid crystal layer is driven by an electric field which is generated by the pixel electrode and the counter electrode,
   wherein part of the plurality of cutout portions are overlapped with the semiconductor layer and a connection portion where the pixel electrode is connected to the thin film transistor,
   wherein the pixel electrode is overlapped with the counter electrode and the cutout portion of the counter electrode, and
   wherein the drain lines and the pixel electrode are formed in different layers.

2. The liquid crystal display device according to claim 1, wherein the semiconductor layer is an a-Si semiconductor film.

3. The liquid crystal display device according to claim 2, wherein the counter electrode is disposed between the pixel electrode and the liquid crystal layer.

4. The liquid crystal display device according to claim 2, wherein the second insulation layer is an organic resin film.

5. The liquid crystal display device according to claim 1, wherein a part of the pixel electrode overlaps with a part of the semiconductor layer.

6. The A liquid crystal display device according to claim 5, wherein the semiconductor layer is an a-Si semiconductor film.

7. The liquid crystal display device according to claim 1, wherein the semiconductor layer is a p-Si semiconductor film.

8. The liquid crystal display device according to claim 1, wherein the pixel electrode is formed of a transparent conductive film.

9. The liquid crystal display device according to claim 1, wherein the pixel electrode is formed of a reflective conductive film.

\* \* \* \* \*